(12) United States Patent
Shida

(10) Patent No.: US 9,114,707 B2
(45) Date of Patent: Aug. 25, 2015

(54) VEHICLE CONTROL SYSTEM FOR MAKING A CONTROL TARGET OF VEHICLE CONTROL APPROPRIATE

(75) Inventor: Mitsuhisa Shida, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 13/811,108

(22) PCT Filed: Jul. 26, 2011

(86) PCT No.: PCT/IB2011/001722
§ 371 (c)(1),
(2), (4) Date: Jan. 18, 2013

(87) PCT Pub. No.: WO2012/014042
PCT Pub. Date: Feb. 2, 2012

(65) Prior Publication Data
US 2013/0116909 A1    May 9, 2013

(30) Foreign Application Priority Data
Jul. 29, 2010    (JP) .................................. 2010-171128

(51) Int. Cl.
| B60K 31/00 | (2006.01) |
| B60W 30/16 | (2012.01) |
| G08G 1/0967 | (2006.01) |
| G08G 1/16 | (2006.01) |

(52) U.S. Cl.
CPC ................ B60K 31/00 (2013.01); B60W 30/16 (2013.01); G08G 1/096783 (2013.01); G08G 1/16 (2013.01); G08G 1/163 (2013.01); B60W 2550/408 (2013.01)

(58) Field of Classification Search
CPC ... B60K 31/00; B60K 31/0008; B60W 30/16; B60W 2720/106; B60W 2550/143; B60T 7/22
USPC ............... 701/36, 93, 96, 117, 118, 119, 301; 180/169, 170, 179; 340/435, 436, 901, 340/903, 904, 906; 342/70, 73; 348/149
See application file for complete search history.

(56) References Cited

U.S. PATENT DOCUMENTS

| 5,969,640 | A | 10/1999 | Timm et al. |
| 6,580,996 | B1 | 6/2003 | Friedrich |
| 8,126,640 | B2 * | 2/2012 | Winner et al. ................. 701/411 |
| 8,504,275 | B2 * | 8/2013 | Schwindt ......................... 701/96 |
| 2005/0228580 | A1 * | 10/2005 | Winner et al. ................. 701/200 |

(Continued)

FOREIGN PATENT DOCUMENTS

| DE | 103 36 905 A1 | 3/2004 |
| EP | 0 813 987 A2 | 12/1997 |

(Continued)

*Primary Examiner* — James Trammell
*Assistant Examiner* — Majdi Alsomiri
(74) *Attorney, Agent, or Firm* — Oliff PLC

(57) ABSTRACT

A vehicle control system includes a controller that is provided in a host vehicle and that controls an acceleration of the host vehicle with the smallest acceleration, from among a first required acceleration that is required based on information related to a running state of a vehicle on a road and a second required acceleration that is required based on a relative relationship between the host vehicle and at least one of a leading vehicle traveling right in front of the host vehicle and an obstacle ahead of the host vehicle, as a target acceleration.

9 Claims, 8 Drawing Sheets

(56) References Cited

U.S. PATENT DOCUMENTS

| | | |
|---|---|---|
| 2007/0050110 A1* | 3/2007 | Kondoh et al. ............... 701/36 |
| 2008/0078600 A1 | 4/2008 | Inoue et al. |
| 2009/0228185 A1* | 9/2009 | Laiou et al. ................. 701/96 |
| 2009/0240413 A1* | 9/2009 | Miyajima et al. ............ 701/70 |
| 2009/0271084 A1 | 10/2009 | Taguchi |
| 2011/0166764 A1* | 7/2011 | Laiou et al. ................. 701/96 |
| 2012/0083987 A1* | 4/2012 | Schwindt .................... 701/96 |
| 2012/0123659 A1* | 5/2012 | Sato et al. ................... 701/96 |
| 2013/0030688 A1* | 1/2013 | Shimizu et al. ............. 701/301 |

FOREIGN PATENT DOCUMENTS

| | | |
|---|---|---|
| JP | A-11-213299 | 8/1999 |
| JP | A-2001-199257 | 7/2001 |
| JP | A-2002-104015 | 4/2002 |
| JP | A-2002-222491 | 8/2002 |
| JP | A-2007-176355 | 7/2007 |
| JP | A-2008-105663 | 5/2008 |
| JP | A-2009-208661 | 9/2009 |
| JP | A-2011-048456 | 3/2011 |

* cited by examiner

RECEIVE INFORMATION FROM
VEHICLES IN GROUP AHEAD → DECELERATE

RECEIVE INFORMATION FROM
VEHICLES IN GROUP AHEAD → DECELERATE

VEHICLE CONTROL SYSTEM FOR MAKING A CONTROL TARGET OF VEHICLE CONTROL APPROPRIATE

BACKGROUND OF THE INVENTION

1. Field of the Invention

The invention relates to a vehicle control system.

2. Description of Related Art

Technology for controlling the running of a host vehicle based on a target vehicle speed is known. For example, Japanese Patent Application Publication No. 2009-208661 (JP-A-2009-208661) describes technology of a vehicle running control system that controls the running of a host vehicle with the lower vehicle speed, from among a cruise control vehicle speed and a limit vehicle speed of a host vehicle running lane, as a target vehicle speed.

There is room for investigation when it comes to making a control target in vehicle control appropriate. For example, it is preferable to also take the process until the target vehicle speed is realized into account. In addition, the mode of appropriate control may differ depending on the road traffic conditions or the relationship to a leading vehicle or the like.

SUMMARY OF THE INVENTION

The invention therefore provides a vehicle control system capable of making a control target in vehicle control appropriate.

A first aspect of the invention relates to a vehicle control system that includes a controller that is provided in a host vehicle and that controls an acceleration of the host vehicle with the smallest acceleration, from among a first required acceleration that is required based on information related to a running state of a vehicle on a road and a second required acceleration that is required based on a relative relationship between the host vehicle and at least one of a leading vehicle traveling right in front of the host vehicle and an obstacle ahead of the host vehicle, as a target acceleration.

In the vehicle control system described above, the controller may obtain a target speed based on the information related to the running state, and may set the first required acceleration based on the target speed.

In the vehicle control system described above, the information related to the running state may include a front vehicle speed that is a speed of a vehicle traveling ahead of the host vehicle, and the target speed may be determined based on the front vehicle speed.

In the vehicle control system described above, the target speed may be determined so as to inhibit congestion on the road from occurring.

In the vehicle control system described above, the information related to the running state may include an amount of traffic on the road, and the target speed may be set determined on a relationship between a running speed and an amount of traffic able to travel on the road.

In the vehicle control system described above, when a set vehicle speed that is a vehicle speed desired by a driver has been input, and the target speed is higher than the set vehicle speed, and the controller controls the host vehicle to run at a vehicle speed that exceeds the set vehicle speed by controlling the acceleration, the controller may perform control to obtain permission from a driver beforehand to run the host vehicle at the vehicle speed that exceeds the set vehicle speed.

In the vehicle control system described above, the controller may obtain a target value related to the relative relationship between the host vehicle and the leading vehicle based on the information related to the running state ahead of the host vehicle, and may set the first required acceleration based on the target value.

In the vehicle control system described above, the controller may obtain an optimum acceleration based on the information related to the running state ahead of the host vehicle, and may set the first required acceleration based on the optimum acceleration.

In the vehicle control system described above, the information related to the running state may include a front vehicle acceleration target value that is a target value of an acceleration of a vehicle traveling ahead of the host vehicle, and the optimum acceleration may be the front vehicle acceleration target value.

The vehicle control system according to the invention both ensures an appropriate relative relationship with a leading vehicle or the like and controls the host vehicle based on the running state of the vehicle on the road, and is therefore able to make the control target in vehicle control appropriate.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, a vehicle control system according to an example embodiment of the invention will be described in detail with reference to the accompanying drawings. The invention is not limited to this example embodiment. Also, constituent elements in the example embodiment described below include those that can easily be envisioned by one skilled in the art or those that are essentially the same.

(Example Embodiment)

Figure 1:
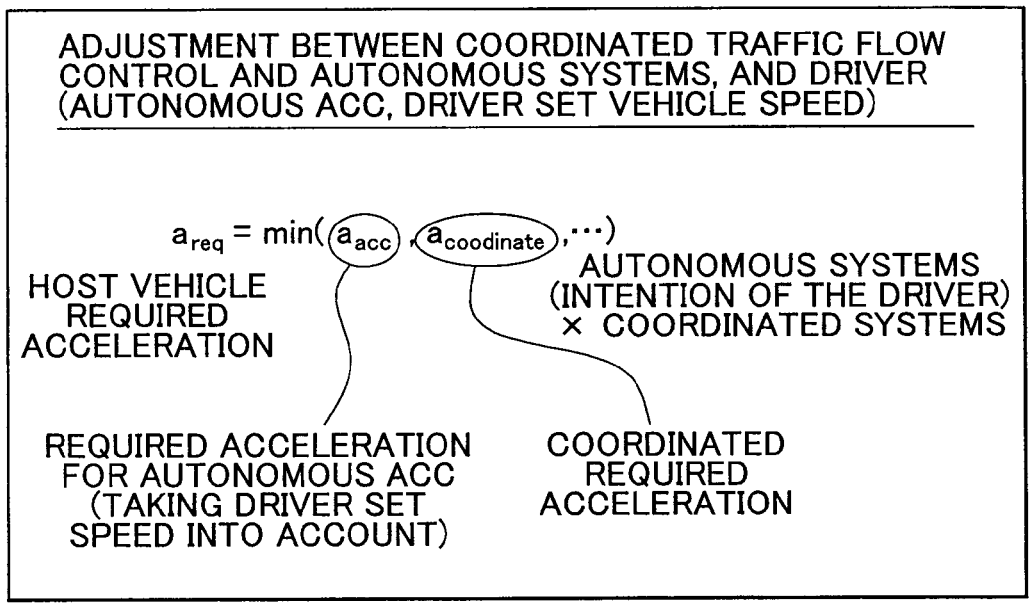
FIG. 1 is a view illustrating a method for adjusting the required acceleration according to an example embodiment of the invention.
Figure 2:
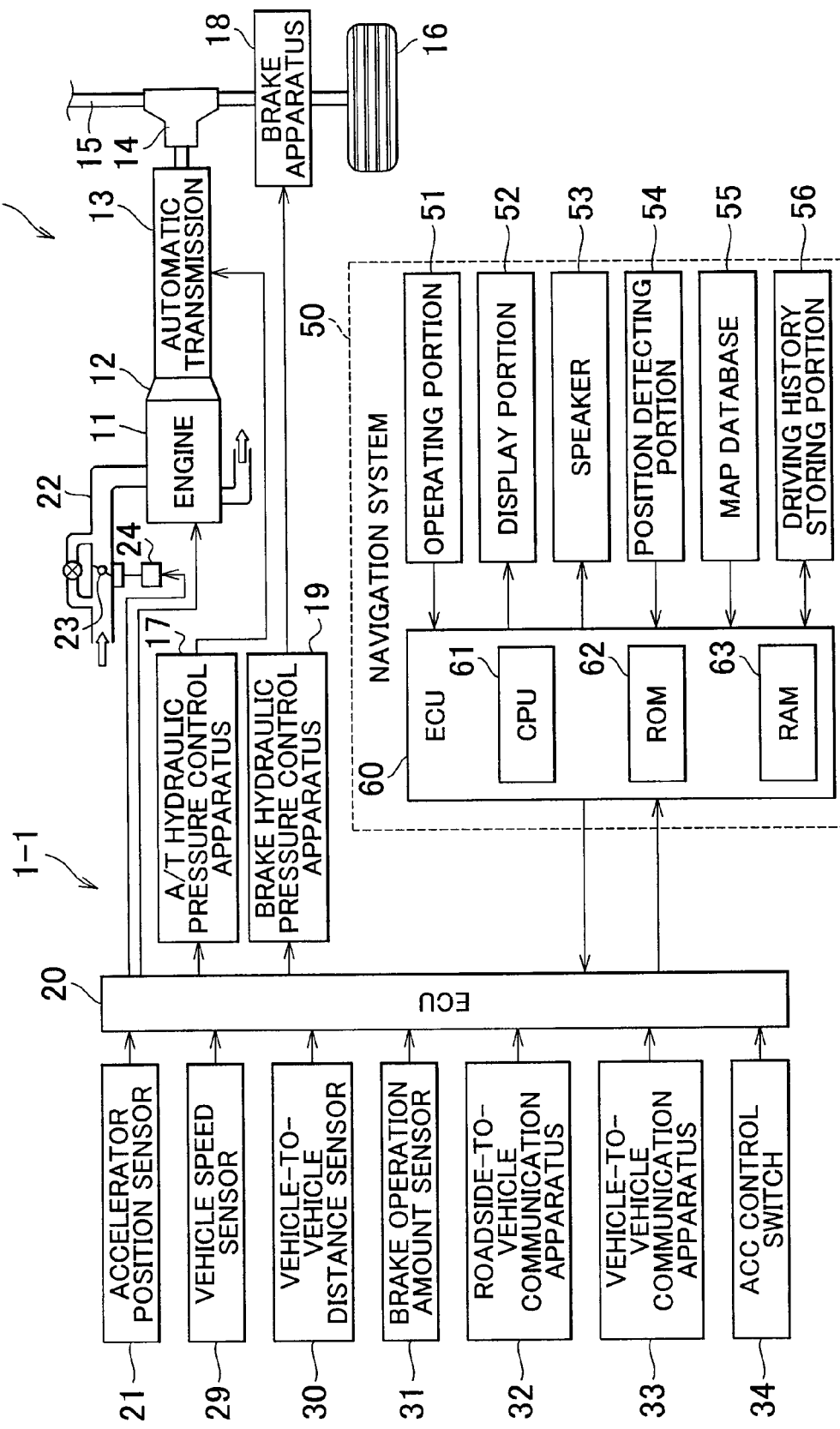
FIG. 2 is a view of a vehicle equipped with a vehicle control system according to the example embodiment.
Figure 3:
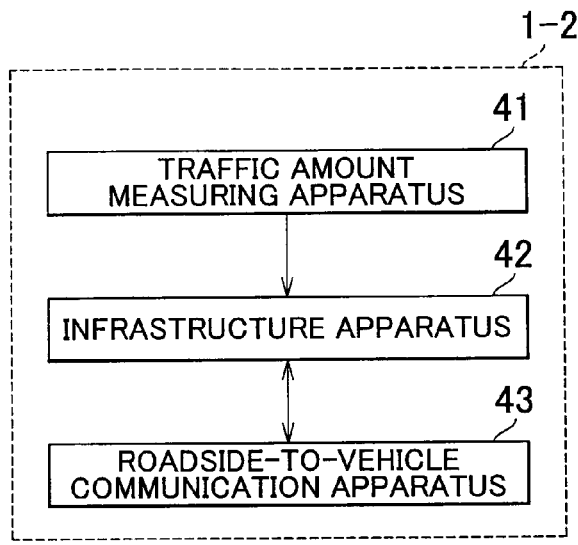
FIG. 3 is a view of an infrastructure system.

The example embodiment will now be described with reference to FIGS. 1 to 12. This example embodiment relates to a vehicle control system. FIG. 1 is a view illustrating a method for adjusting the required acceleration according to the example embodiment, FIG. 2 is a view of a vehicle equipped with a vehicle control system 1-1 according to the example embodiment, and FIG. 3 is a view of an infrastructure system.

As shown in FIG. 1, in this example embodiment, when selecting a target acceleration from two types of required accelerations, i.e., a required acceleration for ACC control (hereinafter simply referred to as "ACC control required acceleration) and a coordinated required acceleration, the smallest value of those required accelerations is selected. Then the acceleration of the host vehicle is controlled with the selected acceleration as the target acceleration. Here, coordinated required acceleration is required acceleration for coordinated traffic flow control that runs a plurality of vehicles in a coordinated manner based on information related to the running state of the vehicles on the road. In coordinated traffic flow control, control in which an "ideal speed" common to a plurality of vehicles is taken as a target speed, for example, is performed. Coordinated required acceleration in this example embodiment corresponds to a first required acceleration. Also, ACC control required acceleration is acceleration that is required based on a relative relationship between the host vehicle and a leading vehicle that is traveling right in front of the host vehicle. ACC control required acceleration corresponds to a second required acceleration.

The "ideal speed" is calculated as a speed that will inhibit congestion from occurring, for example. If the ACC control required acceleration is greater than the coordinated required acceleration, the coordinated required acceleration is used as the host vehicle required acceleration. If, on the other hand, the ACC control required acceleration is less than the coordinated required acceleration, priority is given to ensuring the interval between the host vehicle and the leading vehicle, so the ACC control required acceleration is used as the host vehicle required acceleration.

According to the adjustment of the required acceleration of this example embodiment, the system always works to give priority to deceleration control. If a leading vehicle traveling right in front of the host vehicle is not equipped with a coordinated traffic flow control system, ACC control deceleration assist is given priority with respect to the leading vehicle. Also, the required acceleration for realizing a speed set by a driver is also an object of adjustment, so an adjustment may be made so that the vehicle does not accelerate beyond the vehicle speed set by the driver from the coordinated required acceleration.

As shown in FIG. 2, a vehicle 1 is provided with an engine 11. The engine 11 is connected to an automatic transmission 13 that has a torque converter 12. Driving force of the engine 11 is input to the automatic transmission 13 via the torque converter 12, and then transmitted to driving wheels 16 via a differential gear 14 and a drive shaft 15. The speed ratio of the automatic transmission 13 is automatically controlled according to the operating state of the vehicle by an A/T hydraulic pressure control apparatus 17. A brake apparatus 18 is controlled by a brake hydraulic pressure control apparatus 19 and brakes the vehicle.

The vehicle 1 has an electronic control unit (ECU) 20 that controls the engine 11, the automatic transmission 13, and the brake apparatus 18 and the like. The ECU 20 performs comprehensive control of the engine 11, the automatic transmission 13 (the A/T hydraulic pressure control apparatus 17), and the brake apparatus 18 (the brake hydraulic pressure control apparatus 19). In this example embodiment, the engine 11 serves as acceleration controlling means for controlling acceleration (i.e., the driving force) of the vehicle, by being controlled by the ECU 20 such that the output torque is adjusted. Also, the brake apparatus 18 serves as deceleration controlling means for controlling acceleration (i.e., negative acceleration) of the vehicle 1 by the braking force being controlled by the ECU 20. The ECU 20 functions as a controller that realizes a target acceleration by controlling the engine 11 and the brake apparatus 18 and the like, with the host vehicle required acceleration as the target acceleration.

The vehicle 1 also includes an accelerator position sensor 21 that detects the operation amount (i.e., the accelerator operation amount) of an accelerator pedal. A signal indicative of the accelerator operation amount detected by the accelerator position sensor 21 is output to the ECU 20. A throttle control valve 23 provided in an intake pipe 22 of the engine 11 can be opened and closed by a throttle actuator 24. The ECU 20 is able to control the throttle opening amount of the throttle control valve 23 by the throttle actuator 24 irrespective of the accelerator operation amount. The vehicle 1 also has a throttle opening amount sensor, not shown, that detects a fully closed state (i.e., an idle state) and the throttle opening amount of the throttle control valve 23. Signals indicative of the idle state and the throttle opening amount that are detected by the throttle opening amount sensor are output to the ECU 20.

A vehicle speed sensor 29 detects the speed of the vehicle 1. A vehicle-to-vehicle distance sensor 30 is able to detect the vehicle-to-vehicle distance between the host vehicle and a vehicle right in front of the host vehicle. The vehicle-to-vehicle distance sensor 30 may be a sensor such as a laser radar sensor or a millimeter wave radar sensor mounted on a front portion of the vehicle, for example. The vehicle-to-vehicle distance sensor 30 is also able to detect obstacles ahead of the host vehicle. A brake operation amount sensor 31 detects the operation amount of the brake apparatus 18.

A roadside-to-vehicle communication apparatus 32 communicates with an infrastructure system 1-2 (see FIG. 3) provided on the roadside. A vehicle-to-vehicle communication apparatus 33 communicates with other vehicles. Signals indicative of the detection results from the sensors 29, 30, and 31 are output to the ECU 20. Also, the ECU 20 is connected to the communication apparatuses 32 and 33 and sends and receives signals to and from these communication apparatuses 32 and 33.

The ECU 20 has a shift map, and determines a speed of the automatic transmission 13 based on the throttle opening amount and the vehicle speed and the like, and controls the A/T hydraulic pressure control apparatus 17 to establish the determined speed.

A navigation system 50 basically serves to guide the host vehicle to a predetermined destination, and includes an ECU 60, an operating portion 51, a display portion 52, a speaker 53, a position detecting portion 54, a map database 55, and a driving history storing portion 56. The ECU 60 of the navigation system 50 is able to communicate bi-directionally with the ECU 20.

A CPU 61 of the ECU 60 performs various calculation processing, such as navigation processing, based on information that is input. Various programs for searching for a route to a destination and performing travel guidance along route and the like are stored in ROM 62 of the ECU 60. RAM 63 is read/write memory.

The position detecting portion 54 includes a GPS receiver, a geomagnetic sensor, a distance sensor, a beacon sensor, and a gyro sensor. The position detecting portion 54 detects the position of the host vehicle and outputs data indicative of the detected position of the host vehicle to the ECU 60.

Information necessary for running the vehicle (information relating to maps, straight roads, curves, hills (i.e., uphills and downhills), expressways, sags, and tunnels and the like) is stored in the map database 55. The map database 55 includes map data files, intersection data files, node data files, and road data files. The ECU 60 reads the necessary information referencing the map database 55. The vehicle control system 1-1 of this example embodiment includes the ECU 20, the roadside-to-vehicle communication apparatus 32, the vehicle-to-vehicle communication apparatus 33, the A/T hydraulic pressure control apparatus 17, the brake apparatus 18, and the navigation system 50.

The infrastructure system 1-2 shown in FIG. 3 is a system arranged on the roadside as a traffic infrastructure. The infrastructure system 1-2 transmits information related to coordinated traffic flow control to each vehicle on the road. The infrastructure system 1-2 includes a traffic amount measuring apparatus 41, an infrastructure apparatus 42, and a roadside-to-vehicle communication apparatus 43. The traffic amount measuring apparatus 41 measures the amount of vehicle traffic traveling on the road. The traffic amount measuring apparatus 41 measures the amount of traffic on the road by measuring the number of vehicles in each lane on the road that pass by per unit of time. For example, on an expressway having one running lane and one passing lane for each direction of travel, the traffic amount measuring apparatus 41 measures the amount of traffic in each lane and the total amount of traffic on the expressway by measuring the number of vehicles that pass by per unit of time in both the running lane and the passing lane.

The infrastructure apparatus 42 obtains the amount of traffic measured by the traffic amount measuring apparatus 41 and transmits the amount of traffic via the roadside-to-vehicle communication apparatus 43. The roadside-to-vehicle communication apparatus 43 is a communication apparatus that performs bi-directional communication between the infrastructure system 1-2 and the vehicle control system 1-1. The roadside-to-vehicle communication apparatus 43 receives a signal transmitted from the roadside-to-vehicle communication apparatus 32 of the vehicle control system 1-1. Also, a signal transmitted from the roadside-to-vehicle communication apparatus 43 is received by the roadside-to-vehicle communication apparatus 32 of the vehicle control system 1-1.

In the vehicle 1 in this example embodiment, the ECU 20 performs vehicle control based on information related to the running states of vehicles on the road, that is obtained via vehicle-to-vehicle communication with other vehicles and roadside-to-vehicle communication. The information related to the running states of vehicles on the road includes information related to the running state of each vehicle on the road and information related to the running state of a vehicle in a certain area on the road. For example, the information related to the running states of vehicles on the road may include the current position, direction of travel (bearing), running speed, running acceleration, jerk, distance between vehicles, and time between vehicles, and the like, and the target values for these, for each vehicle. The information related to the running states of vehicles on the road may also include the amount of traffic on the road, the average running speed, and the traffic flow situation and the like.

As vehicle control based on the information related to the running states of vehicles on the road, for example, the ECU 20 generates an "ideal speed" for a smooth traffic flow from the surrounding traffic flow situation obtained by communication, and smoothly controls the host vehicle so that the relative speed with respect to that ideal speed is 0. Further, the ECU 20 is also able to generate an "ideal speed" based on congestion ahead of the host vehicle. In this way, control to run the host vehicle in coordination with other vehicles on the road, such as control to make a common speed for a smooth traffic flow or a speed according to the congestion state a target speed, based on the information related to the running states of vehicles on the road will be referred to as "coordinated traffic flow control" in this example embodiment.

With vehicle-to-vehicle communication, various information including identification information, running information, control target amount information, driver operation information, vehicle specification information, communication standards information, and environment information is transmitted to other vehicles. Identification information includes the ID of the transmitting vehicle and the ID of a group of vehicles to which the transmitting vehicle belongs. Running information is measurement value information related to the running of the host vehicle, such as the current position, direction of travel (bearing), running speed, running acceleration, jerk, distance between vehicles, and time between vehicles, and the like. Control target amount information is a target value, an input value, a control command value, or the like when onboard equipment controls the vehicle 1, and includes the target speed, target acceleration, target jerk, target direction (bearing), target time between vehicles, and target distance between vehicles.

The driver operation information is input information input by the driver or an operation amount of an operation by the driver, and includes an acceleration operation amount, a brake operation amount (depression force and stroke), a directional indicator operation (whether a directional indicator is operated, and if so, the direction of operation), the steering angle, and the ON/OFF of a brake lamp, anti the like. The vehicle specification information includes the vehicle weight, maximum braking force, maximum acceleration force, maximum jerk, and time constant and reaction speed of each actuator (brake, accelerator, shift, etc.). The communication standards information is based on preset rules and includes flags indicative of greeting information and forwarding information, and the like. The environment information is information related to the running environment and includes road information (such as the friction coefficient μ, the gradient, the temperature, and whether the road is wet, dry, or frozen, whether the road is paved (i.e., asphalt) or unpaved) and information regarding the wind speed and wind direction and the like.

In this example embodiment, an example is described in which the ECU 20 of the vehicle 1 automatically controls the speed and acceleration and the like of the vehicle 1 to realize the "ideal speed." However, the coordinated traffic flow control is not limited to this. The coordinated traffic flow control includes not only control that automatically controls the speed and acceleration and the like of the vehicle 1 to realize the "ideal speed," but also control that advises the driver to run the vehicle 1 at the "ideal speed." That is, The coordinated traffic flow control is control for realizing a state in which a plurality of vehicles are run in a coordinated manner, such as making the "ideal speed" a target speed. Control of the running state such as the acceleration, speed, and vehicle-to-vehicle interval and the like may either be performed automatically or manually.

An example of means for advising the driver is a Human Machine Interface (HMI) apparatus that indicates the "ideal speed" to the driver as a preferred target speed for a smooth traffic flow. For example, a display device that preferably displays the running speed may be provided on an instrument panel or the like. In this case, the coordinated traffic flow control performed by the ECU 20 assists the driver by performing control to display the "ideal speed" on the display device so that the vehicle 1 can be run at that speed. In this example embodiment, a vehicle provided with the vehicle control system 1-1 capable of executing coordinated traffic flow control will be referred to as a "system-equipped vehicle". Also, when describing the relationship with other vehicles and the like, the vehicle 1 may also be referred to as "the host vehicle 1."

The vehicle 1 in this example embodiment is able to execute Adaptive Cruise Control (ACC) (hereinafter referred to as ACC control"). With ACC control, following control that detects a leading vehicle using radar or the like and controls the vehicle 1 to follow the leading vehicle while maintaining a certain vehicle-to-vehicle distance with respect to the leading vehicle, as well as constant speed running control that runs the vehicle 1 so that the vehicle speed of the vehicle 1 is a constant vehicle speed are able to be executed. Vehicle control according to ACC control is executed by the ECU 20, for example.

As shown in FIG. 2, the vehicle 1 has an ACC control switch 34. This ACC control switch 34 is used by the driver to perform various operations related to ACC control. For example, using the ACC control switch 34, the driver is able to turn ACC control on and off, input a set vehicle speed, and input a predetermined distance for following a leading vehicle, and the like.

With constant speed running control, the vehicle speed is automatically controlled using a set vehicle speed input by the driver as the target speed. For example, when there is no leading vehicle while ACC control is being executed, the ECU 20 performs running control of the vehicle 1 such that the vehicle runs maintaining the set vehicle speed. Also, when a leading vehicle that is traveling at a slower speed than the set vehicle speed is detected, the ECU 20 performs following control to keep the vehicle-to-vehicle distance to the leading vehicle at a predetermined distance input in advance. The ECU 20 is able to detect a leading vehicle that is in the same lane as the host vehicle based on the detection results from the vehicle-to-vehicle distance sensor 30. The ECU 20 controls the vehicle speed and acceleration of the vehicle 1 so that the vehicle-to-vehicle distance to the leading vehicle will not become less than the predetermined distance. Accordingly, if the vehicle speed of the leading vehicle is a lower speed than the set vehicle speed, the ECU 20 reduces the vehicle speed of the host vehicle to maintain the vehicle-to-vehicle distance.

The vehicle 1 in this example embodiment is able to suppress congestion from occurring and the like by executing coordinated traffic flow control. One cause of congestion on expressways and the like is the limits of people's cognitive abilities, decision-making abilities, and operating abilities. For example, there are limitations to a driver's cognitive ability, such as not being able to see anywhere but right in front of the vehicle or changes in the road gradient being difficult to recognize or misperceived. There are limitations to a driver's decision-making ability, such as not being able to make a decision while looking at the overall traffic flow, and there are limitations to a driver's operating ability, such as not being able to operate the vehicle fast enough to adjust for the movement of a vehicle directly in front. Therefore, when a leading vehicle decelerates, congestion may occur due to a deceleration shockwave spreading to trailing vehicles while the reduction in speed is amplified.

Figure 4:
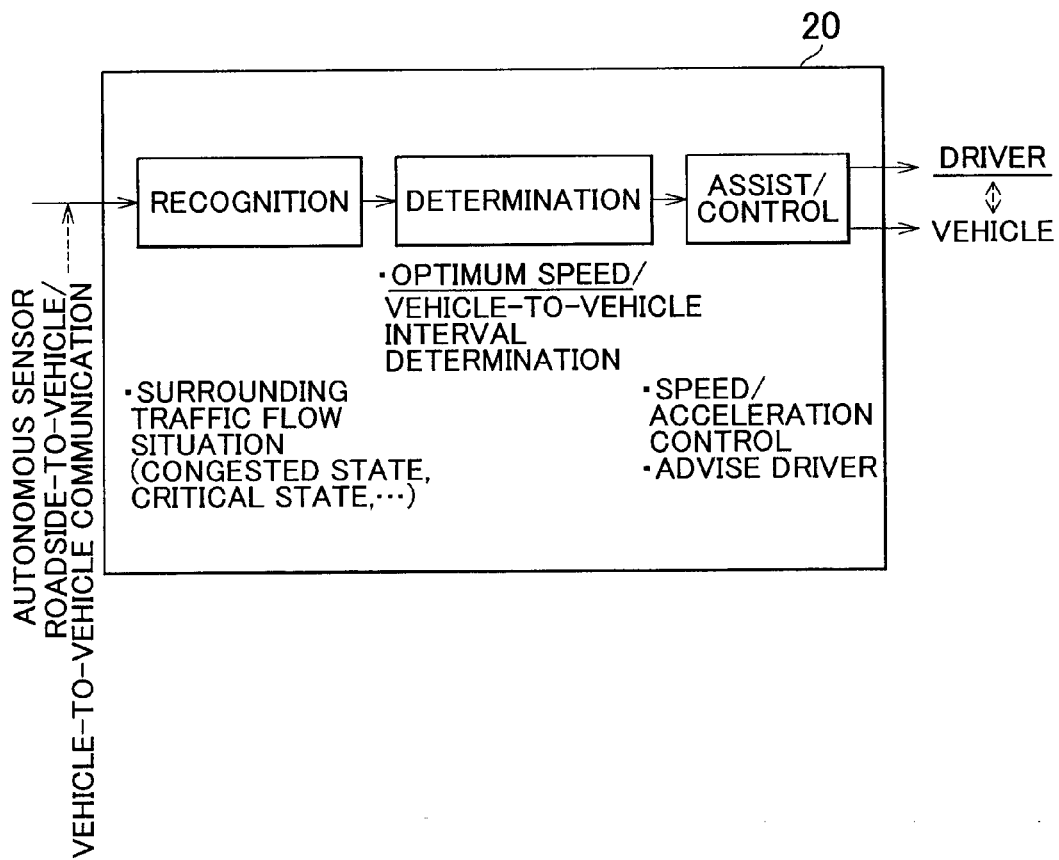
FIG. 4 is a view illustrating functions of an ECU in the example embodiment.
Figure 5:
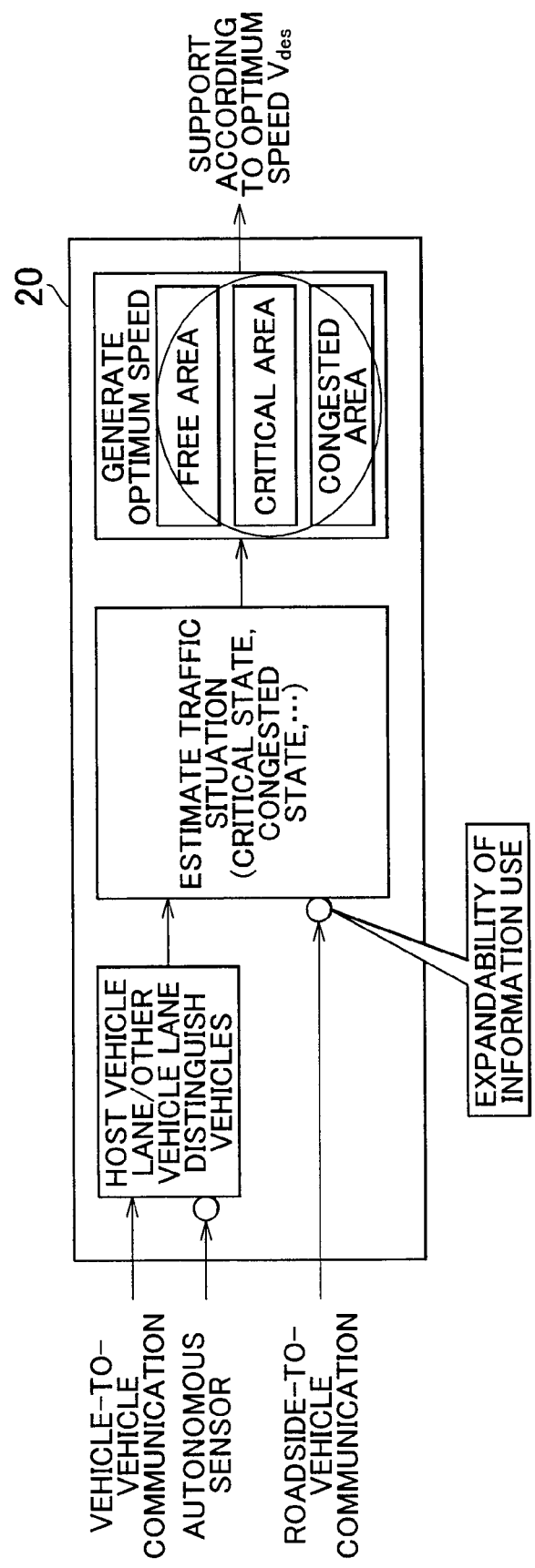
FIG. 5 is another view illustrating functions of the ECU in the example embodiment.

In this example embodiment, the ECU 20 has a function in which it generates an "ideal speed" for coordinated traffic flow control, and controls the vehicle 1 with this speed as the target speed. FIGS. 4 and 5 are views showing functions of the ECU 20. As shown in FIG. 4, the ECU 20 has a function in which it recognizes the surrounding traffic flow situation, a function in which it determines the optimum speed and the like, and a function in which it controls the vehicle 1. Also, instead of or in addition to the function of controlling the vehicle 1, the ECU 20 may also have an assist function in which it advises the driver.

The recognition function is a function of, for example, recognizing an unforeseen/undetectable future traffic situation, e.g., a traffic situation ahead that is unable to be seen with a person or autonomous sensors such as vehicle-to-vehicle distance sensor 30. The ECU 20 recognizes the surrounding traffic flow situation based on information obtained via roadside-to-vehicle communication and vehicle-to-vehicle communication. Here, the surrounding traffic flow situation is information related to the running states of the vehicles traveling on the road on which the host vehicle is traveling and in the same direction as the host vehicle. The term "surrounding" in this case refers to, for example, the area around the host vehicle on the road on which the host vehicle is traveling, and includes the lane in which the host vehicle is traveling, as well as other lanes that are in the same direction of travel but in which the vehicle is not traveling. Further, the term "surrounding" may also include the areas to the front and sides of the host vehicle, as well as the area to the rear of the host vehicle.

As shown in FIG. 5, the ECU 20 is able to distinguish between a vehicle in the host vehicle lane and a vehicle in another vehicle lane. For example, the ECU 20 is able to determine, based on the vehicle position information transmitted from a system-equipped vehicle, whether that system-equipped vehicle is traveling in the same lane as the host vehicle (i.e., in the host vehicle lane), or whether it is traveling in another vehicle lane. The ECU 20 is able to determine whether the host vehicle and the other system-equipped vehicle are in the same lane based, for example, on position information related to the lanes of the road obtained from the navigation system 50, position information of the host vehicle, and position information of the other system-equipped vehicle.

Figure 6:
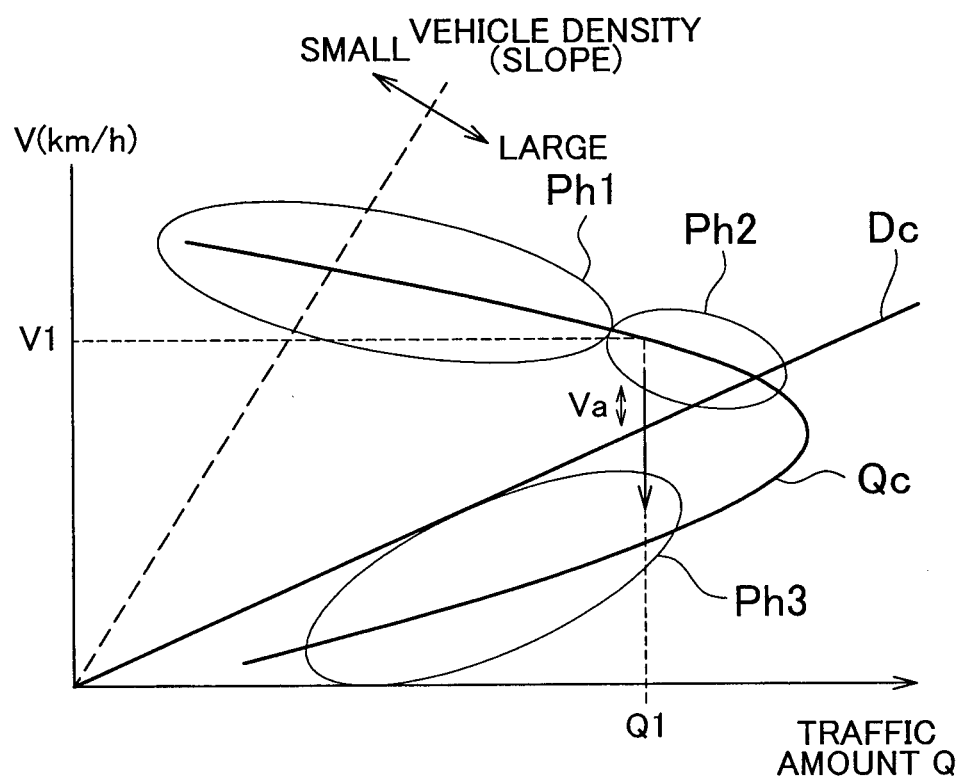
FIG. 6 is a view illustrating an example of a method for determining a congested state or a critical state.

The traffic flow situation includes the running state of each vehicle on the road and the state of the flow of vehicles on the road. The state of the flow of vehicles may be recognized as a congested state or a critical state or the like, for example. The congested state or the critical state may be determined based on, for example, the vehicle speed and the amount of traffic. For example, it is possible to determine whether the traffic flow situation ahead of the host vehicle is a congested state or a critical state based on the vehicle speed of a system-equipped vehicle traveling ahead of the host vehicle that is obtained through vehicle-to-vehicle communication, and the amount of traffic that is obtained from the infrastructure apparatus 42 through roadside-to-vehicle communication. FIG. 6 is a view showing one example of a method for determining the congested state or the critical state. In FIG. 6, the horizontal axis represents the traffic amount Q and the vertical axis represents the average vehicle speed V. The traffic amount Q is the number of vehicles that pass by per unit time in each lane (i.e., number of vehicles/(amount of time×number of lanes)). That is, FIG. 6 shows the relationship between the running speed and the amount of traffic able to travel on the road. The slope of the straight dash line passing through the point of origin in FIG. 6 represents the vehicle density on the road. The vehicle density increases as a result of an increase in the traffic amount Q or a decrease in the average vehicle speed V, and decreases as a result of a decrease in the traffic amount Q or an increase in the average vehicle speed V. Also, the straight line Dc represents the critical density. Congestion tends to occur when the vehicle density exceeds the critical density Dc.

The curve Qc represents a maximum traffic amount line. The maximum traffic amount line Qc represents the relationship between each average vehicle speed V and the maximum amount of traffic that can travel on the road. The maximum traffic amount line Qc corresponds to an average vehicle-to-vehicle time characteristic when people are driving the vehicles. Phase Ph1 represents a free phase, phase Ph2 represents a critical phase, phase Ph3 represents a congested phase. The free phase Ph1 corresponds to a range in which the vehicle density on the maximum traffic amount line Qc is small. The critical phase Ph2 is a range in which the vehicle density is larger than it is in the free phase Ph1 on the maximum traffic amount line Qc, and corresponds to a range that is near the critical density Dc and in which the vehicle density is smaller than the critical density Dc. The congestion phase Ph3 corresponds to a range in which the vehicle density is greater the critical density Dc on the maximum traffic amount line Qc.

If the vehicle density exceeds the critical density Dc, the uniform flow will become uneven, and even a slight fluctuation in speed will be transmitted while growing in the direction opposite the direction in which the vehicle is traveling (i.e., a deceleration shockwave), causing the phase to change to the congestion phase Ph3 all of a sudden (i.e., a phase shift). For example, a state in which the average vehicle speed is V1 and the amount of traffic is Q1 is a state in which the phase is the critical phase Ph2, i.e., a critical state. In this critical state, the vehicle density may easily exceed the critical density Dc, and thus congestion may easily occur, due to an external disturbance or a further increase in the amount of traffic. For example, if a shockwave in which a reduction in speed spreads to trailing vehicles occurs at a sag or the like, congestion may easily occur due to a phase shift.

The determining function of the ECU 20 is a function in which the ECU 20 determines a speed and vehicle-to-vehicle interval for a smooth traffic flow. For example, it may be possible to prevent the traffic flow situation from reaching the critical state or the critical state may be able to be alleviated, by running the vehicles at a vehicle speed lower than the current vehicle speed. Conversely, it may be possible to prevent the traffic flow situation from reaching the critical state or the critical state may be able to be alleviated, by running the vehicles at a vehicle speed higher than the current vehicle speed. The ECU 20 determines the optimum speed within a range of speeds at which the traffic flow will be smooth and the critical state will not be reached with the obtained amount of traffic, for example.

For example, when the obtained amount of traffic is Q1, the ECU 20 is able to determine the optimum speed within a range Va of speeds at which the critical state will not be reached and that will not exceed the critical density Dc. In this case, a vehicle speed closest to the average vehicle speed of the current traffic flow, or a vehicle speed near that vehicle speed, within the range Va of speeds at which the critical state will not be reached and that will not exceed the critical density Dc may be set as the optimum speed. Alternatively, the maximum vehicle speed within the range Va of speeds, or a vehicle speed that is equal to or less than the maximum vehicle speed and near the maximum vehicle speed, may be set as the optimum speed. Also, from the standpoint of emphasizing the stability of the vehicle group, an intermediate value within the range Va of speeds may be set as the optimum speed. In this way, the optimum speed determined by the range Va of speeds at which the critical state will not be reached and that will not exceed the critical density Dc is a speed that is capable of inhibiting the occurrence of congestion on the road. The range Va of speeds that is the selection range for the optimum speed is not limited to this. For example, the maximum value of the range Va of speeds may be any value as long as it is a speed that is less than a speed V1. Also, the minimum value of the range Va of speeds may be any value as long as it is equal to or greater than the speed of the point of intersection on the low vehicle speed side, from among the two points of intersection between the straight line denoting the traffic amount Q1 and the maximum traffic amount line Qc. The minimum value of the range Va of speeds is preferably a speed greater than the speeds of the congested phase Ph3.

The corresponding relationship between the obtained traffic amount and the determined optimum speed is preferably the same or similar in each vehicle control system 1-1. For example, even with two vehicles of different manufacturers, the optimum speed is preferably the same vehicle speed or a similar vehicle speed when the same traffic amount is obtained from the infrastructure system 1-2.

The ECU 20 controls the speed and acceleration of the vehicle 1 with the determined optimum speed and vehicle-to-vehicle interval as the target speed and the target vehicle-to-vehicle interval. The ECU 20 calculates the target acceleration according to Expression (1) below, for example.

$$a_{coordinate} = k_a \times a_{des} + k_v \times (v_{des} - v) + k_d \times (d_{des} - d) \quad (1)$$

Here, $a_{coordinate}$ is the required acceleration for coordinated traffic flow control, $a_{des}$ is the ideal acceleration, v is the current vehicle speed, $d_{des}$ is the ideal vehicle-to-vehicle interval, d is the current vehicle-to-vehicle interval, and $k_a$, $k_v$, and $k_d$ are coefficients (gain) set in advance. Coefficient $k_a$ may be 1, for example. In the description below, the required acceleration for coordinated traffic flow control may also simply be referred to as "coordinated required acceleration."

The ideal acceleration $a_{des}$ is the optimum acceleration, and is based on information related to the running state of a vehicle ahead of the host vehicle 1, for example. This ideal acceleration $a_{des}$ may be set as a target acceleration for a system-equipped vehicle traveling ahead of the host vehicle (i.e., a forward vehicle acceleration target value) that is obtained through vehicle-to-vehicle communication. The target acceleration of the system-equipped vehicle ahead may be a driver required acceleration based on a driving operation by the driver, or it may be a required acceleration of a system provided in the vehicle, such as the coordinated required acceleration. Accordingly, feed-forward control that accelerates or decelerates the host vehicle in synchronization with acceleration or deceleration of the system-equipped vehicle ahead can be performed. As a result, a deceleration shockwave that spreads from the front and the like is able to be absorbed by the host vehicle and stopped, as will be described with reference to FIGS. 7 and 8 later. The ideal speed $v_{des}$ is the optimum speed determined by the ECU 20. The ideal vehicle-to-vehicle interval $d_{des}$ is the vehicle-to-vehicle interval determined by the ECU 20. The ideal vehicle-to-vehicle interval $d_{des}$ is calculated based on information related to the running state of the vehicle ahead of the host vehicle, such as the speed of the vehicle ahead or the like. The vehicle-to-vehicle interval indicates the relative relationship with the leading vehicle right in front of the vehicle 1, such as the vehicle-to-vehicle distance or the vehicle-to-vehicle time. In Expression (1) above, the second and third terms on the right are feedback control amounts.

The coefficients $k_a$, $k_v$, and $k_d$ are determined in advance based on the results from testing or simulation. These coefficients $k_a$, $k_v$, and $k_d$ are determined taking into account the improvement in the stability of the group of vehicles, and the riding comfort of the vehicle 1 and the like, for example. The stability of the group of vehicles is indicated by the spreading ratio of the amount of decrease in vehicle-to-vehicle distance when deceleration spreads to trailing vehicles after a leading vehicle decelerates, for example. If this spreading ratio exceeds 1, the vehicle-to-vehicle distance becomes closer for vehicles farther back, thus producing a deceleration shockwave.

Figure 7:
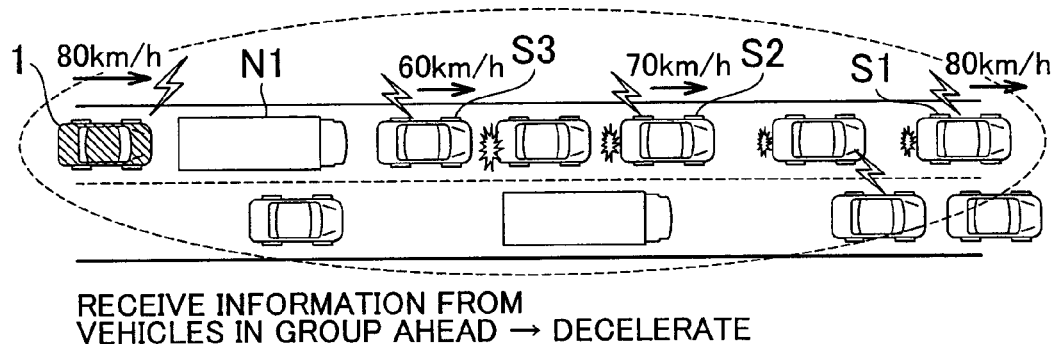
FIG. 7 is a view showing a state in which there is a deceleration shockwave.
Figure 8:
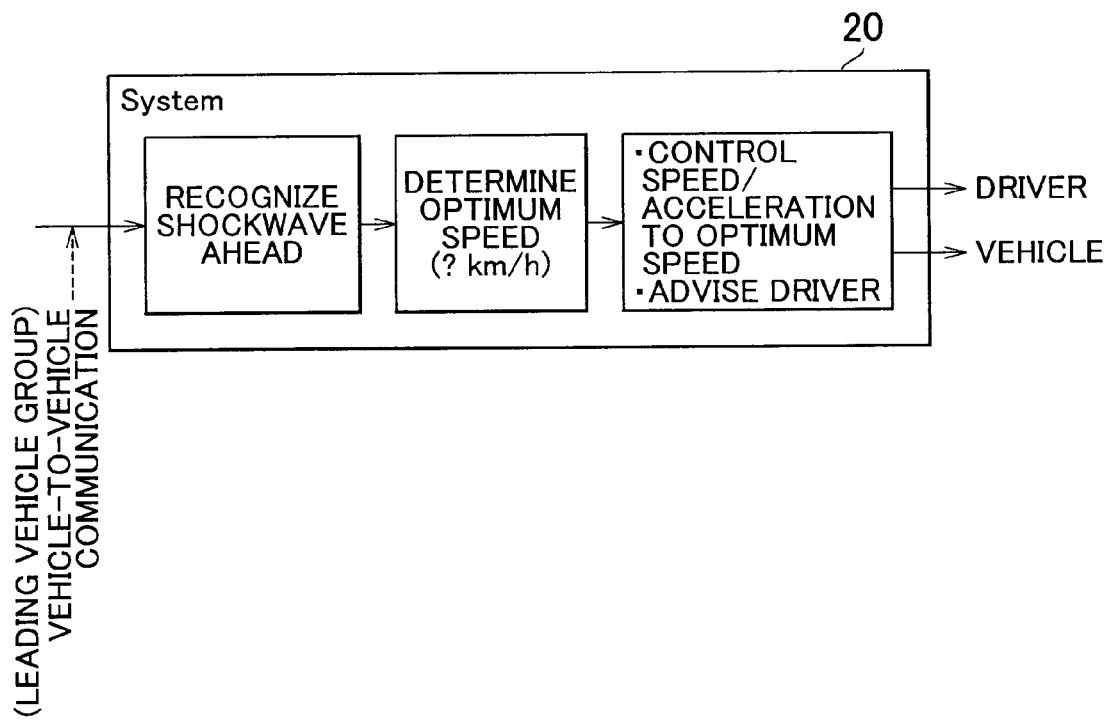
FIG. 8 is a view of vehicle control when there is a deceleration shockwave.

FIG. 7 is a view showing a state in which there is a deceleration shockwave on an expressway, and FIG. 8 is a view of vehicle control when there is a deceleration shockwave. Coordinated traffic flow control is not limited to being executed on expressways, it may also be executed on other roads. In FIG. 7, vehicles S1, S2, and S3 represent system-equipped vehicles traveling ahead of the vehicle 1 in the host vehicle lane. Of the system-equipped vehicles S1 to S3, the system-equipped vehicle S1 is the farthest ahead and the system-equipped vehicle S3 is the farthest to the rear. A deceleration shockwave causes the speed reduction width to be amplified more with vehicles that are farther back. With respect to a speed of 80 km/h of the system-equipped vehicle S1 that is farthest ahead, the speed of the second system-equipped vehicle S2 is reduced to 70 km/h, and the speed of the third system-equipped vehicle S3 is reduced to 60 km/h. The deceleration shockwave has not reached the vehicle 1, so the vehicle 1 is traveling at 80 km/h.

As shown in FIG. 8, the ECU 20 obtains the current vehicle speed of each of the system-equipped vehicles S1, S2, and S3, and recognizes a deceleration shockwave. The ECU 20 may also recognize a deceleration shockwave based on the information of the vehicle-to-vehicle distance to the leading vehicle, or the braking states of the system-equipped vehicles S1, S2, and S3, in addition to the vehicle speeds. By recognizing a deceleration shockwave based on the information transmitted from the system-equipped vehicles ahead in this way, the vehicle 1 can begin to decelerate before the deceleration shockwave reaches the host vehicle 1. When the ECU 20 determines that there is a deceleration shockwave ahead of the host vehicle 1, the ECU 20 determines the optimum speed. The optimum speed is the average speed (i.e., 70 km/h) or the slowest speed (i.e., 60 km/h) of the group of leading vehicles in the host vehicle lane. The ECU 20 determines the ideal acceleration and the ideal vehicle-to-vehicle interval based on the information obtained from the group of leading vehicles. Then the ECU 20 calculates the required acceleration for coordinated traffic flow control from Expression (1) above based on the ideal speed, the ideal acceleration, and the ideal vehicle-to-vehicle interval, and controls the vehicle 1 with this required acceleration as the target acceleration.

Being able to recognize a deceleration shockwave ahead via communication in this way enables the proximity of a deceleration shockwave to be known even if a large leading vehicle N1 that is not a system-equipped vehicle is traveling right in front of the host vehicle 1, for example, such that the area ahead is not visible. The ECU 20 is able to decelerate the host vehicle 1 before the deceleration shockwave reaches the host vehicle 1. For example, by starting to decelerate the host vehicle 1 before the leading vehicle N1 starts to decelerate, a sufficient vehicle-to-vehicle distance to the leading vehicle N1 is able to be ensured, making it possible to inhibit the vehicle-to-vehicle interval from becoming smaller due to the deceleration shockwave. In this way, relative speed control of the host vehicle 1 with respect to the system-equipped vehicles ahead enables the deceleration shockwave to be attenuated and quickly absorbed.

Figure 9:
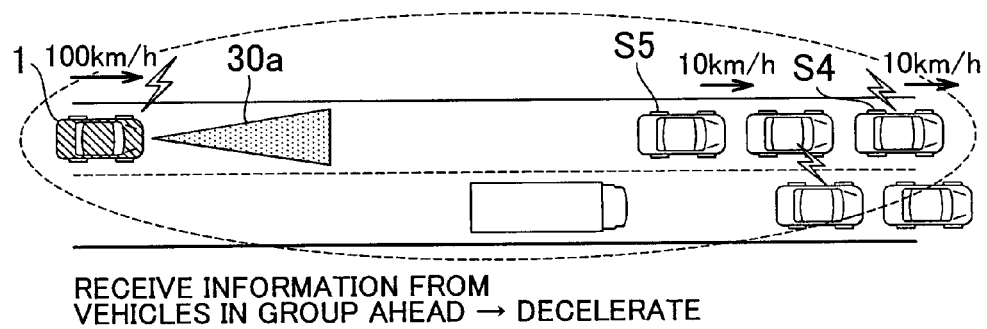
FIG. 9 is a view showing a state in which there is congestion ahead of a host vehicle.
Figure 10:
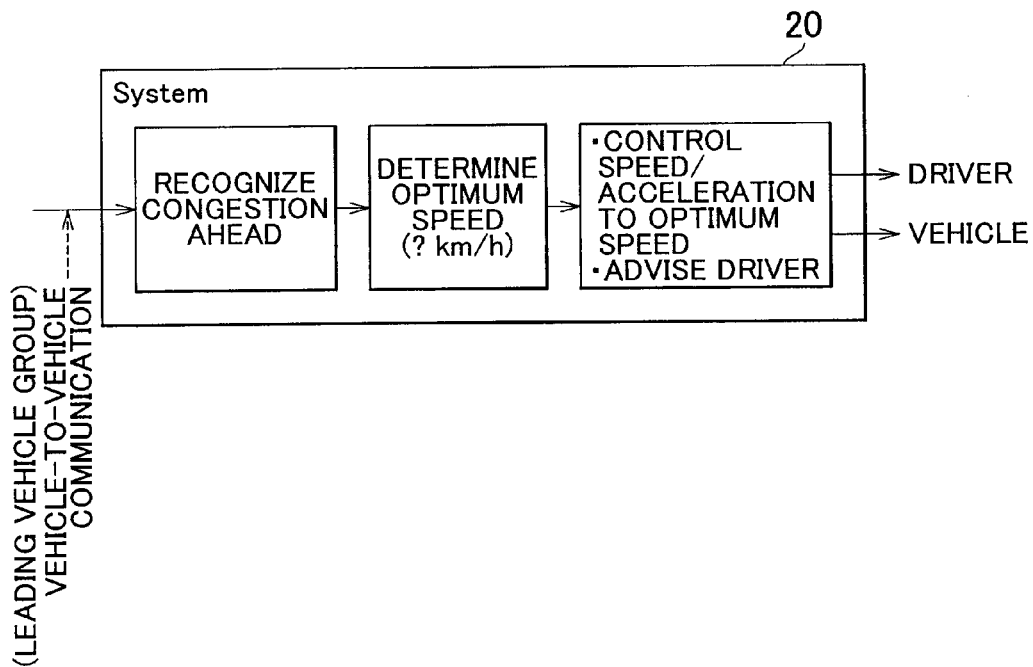
FIG. 10 is a view of vehicle control when approaching congestion.

FIG. 9 is a view showing a state in which there is congestion ahead of the host vehicle on an expressway, and FIG. 10 is a view of vehicle control when approaching congestion. In FIG. 9, vehicles S4 and S5 represent system-equipped vehicles that are traveling ahead of the host vehicle 1 in the host vehicle lane. The system-equipped vehicles S4 and S5 are in a group of vehicles in congestion, and the system-equipped vehicle S5 is the last vehicle in the congestion. The system-equipped vehicles S4 and S5 are both traveling at a speed of 10 km/h. The host vehicle 1 is unable to directly see the congestion and is traveling at a speed of 100 km/h.

As shown in FIG. 10, the ECU 20 of the host vehicle 1 recognizes that there is congestion ahead in the host vehicle lane based on information obtained from the system-equipped vehicles S4 and S5 ahead via vehicle-to-vehicle communication. When the ECU 20 recognizes that there is congestion ahead, the ECU 20 generates an ideal speed from the speed of the group of leading vehicles in the host vehicle lane. The generated optimum speed may be the average speed (10 km/h) or the slowest speed (10 km/h) of the group of leading vehicles. That is, the target speed is determined based on the front vehicle speeds that are the speeds of the vehicles (S4 and S5) traveling ahead of the host vehicle. Also, the ECU 20 determines an ideal acceleration and an ideal vehicle-to-vehicle interval based on information obtained from the group of leading vehicles. Then the ECU 20 calculates a coordinated required acceleration from Expression (1) above based on the ideal speed, acceleration, and vehicle-to-vehicle interval, and controls the vehicle 1 with this required acceleration as the target acceleration.

Being able to recognize congestion ahead earlier and decelerate early in this way enables the vehicle 1 to smoothly approach the ideal speed (i.e., the speed of the congestion ahead). For example, the host vehicle 1 can start to be decelerated before the system-equipped vehicle S5 that is the last vehicle in the congestion enters the detection range 30a of the vehicle-to-vehicle distance sensor 30. Accordingly, sudden braking is suppressed and deceleration control can begin smoothly with respect to the tail end of the congestion.

Also, the ECU 20 can recognize congestion earlier and decelerate accordingly, even if that congestion is out of sight from the vehicle 1, such as behind a bend.

Here, in a vehicle equipped with a system capable of executing coordinated traffic flow control and a system capable of executing ACC control such as the vehicle 1 in this example embodiment, the adjustment of a plurality of required accelerations is necessary. In this example embodiment, the plurality of required accelerations are adjusted by taking the smallest value of a plurality of required accelerations. The ECU 20 calculates the acceleration required for the host vehicle 1 according to Expression (2) below.

$$a_{req} = \min(a_{acc}, a_{coordinate}, \ldots) \quad (2)$$

Here, $a_{req}$ is the vehicle required acceleration and $a_{acc}$ is the required acceleration for ACC control. In the description below, the required acceleration $a_{acc}$ for ACC control may also simply be referred to as "ACC required acceleration $a_{acc}$."

The ACC required acceleration $a_{acc}$ is the acceleration required based on the set vehicle speed and the vehicle-to-vehicle distance to the leading vehicle right in front, in ACC control. For example, if no leading vehicle is detected by the vehicle-to-vehicle distance sensor 30, the ACC required acceleration $a_{acc}$ is calculated such that the speed difference between the set vehicle speed and the current vehicle speed is 0. Also, if a leading vehicle is detected by the vehicle-to-vehicle distance sensor 30 and the speed of that leading vehicle is less than the set vehicle speed, the ACC required acceleration $a_{acc}$ is calculated such that the difference between the actual vehicle-to-vehicle distance to the leading vehicle and a predetermined distance set in advance is 0. For example, if the vehicle-to-vehicle distance to the leading vehicle is too close, the ACC required acceleration $a_{acc}$ is calculated as a negative acceleration.

If the ECU 20 selects the host vehicle required acceleration $a_{req}$ from two types of required accelerations, i.e., the ACC required acceleration $a_{acc}$ and the coordinated required acceleration $a_{coordinate}$, as the required acceleration, the ECU 20 adjusts the required acceleration by selecting the smallest of these (hereinafter this process will be referred to as "minimum select"). Thus, the ECU 20 is able to appropriately select the host vehicle required acceleration $a_{req}$. When the ACC required acceleration $a_{acc}$ is a lower acceleration than the coordinated required acceleration $a_{coordinate}$, it means that a negative acceleration is required as the ACC required acceleration $a_{acc}$ due to the proximity to the leading vehicle, for example. In such a case, an appropriate vehicle-to-vehicle distance to the leading vehicle is able to be maintained by selecting ACC required acceleration $a_{acc}$ according to minimum select as the host vehicle required acceleration $a_{req}$. Also, the ACC required acceleration $a_{acc}$ for following a set vehicle speed input by the driver is also an object for adjustment, so the host vehicle 1 is restricted to being accelerated beyond the vehicle speed set by the driver from the coordinated required acceleration $a_{coordinate}$.

On the other hand, if the coordinated required acceleration $a_{coordinate}$ is a smaller acceleration than the ACC required acceleration $a_{acc}$, the host vehicle 1 can be inhibited from accelerating beyond the optimum speed for a smooth traffic flow or the like by selecting the coordinated required acceleration $a_{coordinate}$ as the host vehicle required acceleration $a_{req}$.

Figure 11:
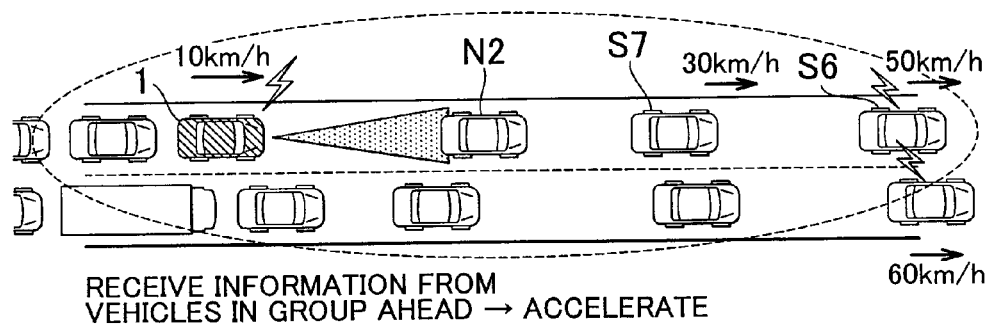
FIG. 11 is a view showing a state in which congestion ahead has been relieved.
Figure 12:
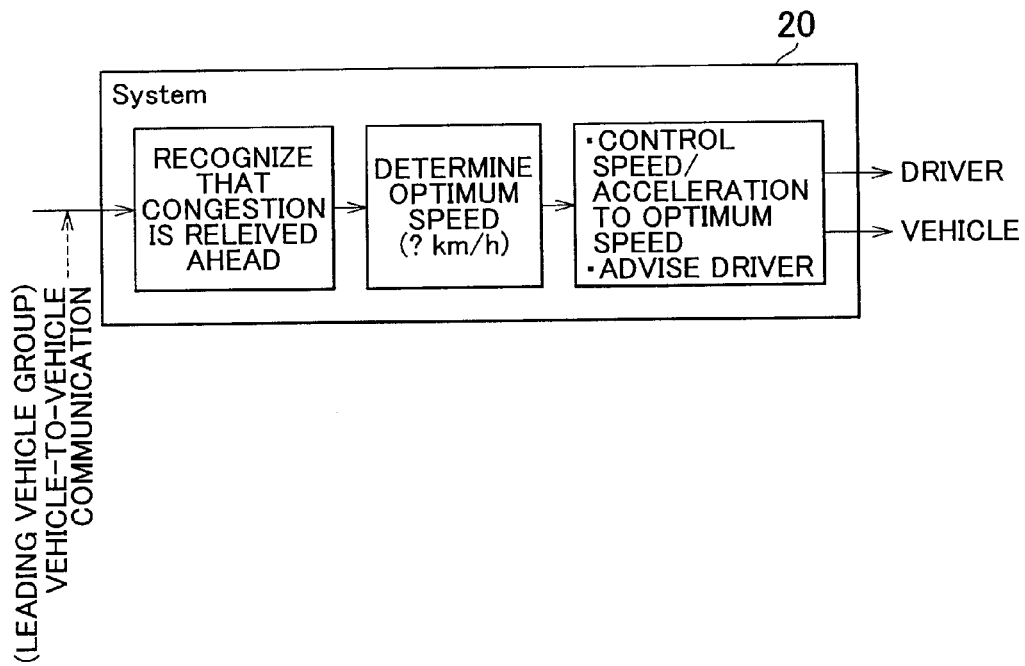
FIG. 12 is a view of vehicle control when congestion ahead has been relieved.

FIG. 11 is a view showing a state in which congestion ahead on an expressway has been relieved, and FIG. 12 is a view of vehicle control when congestion ahead has been relieved. In FIG. 11, vehicles S6 and S6 represent system-equipped vehicles traveling ahead of the host vehicle 1 in the host vehicle lane. Also, vehicle N2 represents a leading vehicle traveling right in front of the host vehicle 1. The leading vehicle N2 is an ordinary vehicle that is not a system-equipped vehicle. Of the system-equipped vehicles ahead of the host vehicle 1, the system-equipped vehicle S6 that is traveling ahead is accelerating to a speed of 50 km/h after congestion has been relieved, and the system-equipped vehicle S7 to the rear is accelerating to a speed of 30 km/h. The host vehicle 1 is traveling at a speed of 10 km/h. The ECU 20 is able to recognize that congestion is relieved ahead based on the speed of the system-equipped vehicles ahead of the host vehicle. For example, the ECU 20 is able to recognize that congestion is relieved based on the fact that the vehicle speed is becoming faster with system-equipped vehicles that are traveling farther ahead. With coordinated traffic flow control, acceleration is required to match the system-equipped vehicles S6 and S7 in the group of leading vehicles. For example, the coordinated required acceleration $a_{coordinate}$ is calculated with the speed and acceleration of the system-equipped vehicle S7 that is right in front of the host vehicle 1 as the ideal speed and the ideal acceleration. As a result, the ECU 20 is able to recognize earlier that congestion ahead has been relieved, and perform early acceleration assist so that the vehicle speed smoothly approaches the ideal speed (i.e., the speed of the traffic flow ahead).

Meanwhile, with ACC control, the ACC required acceleration $a_{acc}$ is calculated to match the leading vehicle N2. For example, if the vehicle-to-vehicle distance between the host vehicle 1 and the leading vehicle N2 is less than a predetermined distance, the ACC required acceleration $a_{acc}$ becomes a value that requires deceleration. In this case, as a result of adjustment, the ACC required acceleration $a_{acc}$ that is the smallest value of the required accelerations is used as the host vehicle required acceleration $a_{req}$. Also, if the leading vehicle N2 accelerates sufficiently such that the vehicle-to-vehicle interval between the host vehicle 1 and the leading vehicle N2 increases, the coordinated required acceleration $a_{coordinate}$ is used as the host vehicle required acceleration $a_{req}$. Actively accelerating the host vehicle 1 based on the coordinated required acceleration $a_{coordinate}$ is advantageous in that it enables congestion to be relieved earlier.

An adjustment that uses the smallest value, from among the ACC required acceleration $a_{acc}$ and the coordinated required acceleration $a_{coordinate}$, as the host vehicle required acceleration $a_{req}$ may also be performed only when the ACC required acceleration $a_{acc}$ is the required acceleration calculated based on the vehicle-to-vehicle interval to the leading vehicle N2. In other words, the smallest value of the ACC required acceleration $a_{acc}$ and the coordinated required acceleration $a_{coordinate}$ may be set as the host vehicle required acceleration $a_{req}$ as long as following control with respect to the leading vehicle is being performed. In this case, if constant speed running control in which the set vehicle speed is set as the target speed in ACC control, the adjustment of the ACC required acceleration $a_{acc}$ and the coordinated required acceleration $a_{coordinate}$ may be something other than minimum select. For example, an adjustment that preferentially uses the coordinated required acceleration $a_{coordinate}$ as the host vehicle required acceleration $a_{req}$ may also be performed.

Here, if, as a result of an adjustment, the coordinated required acceleration $a_{coordinate}$ is used as the host vehicle required acceleration $a_{req}$, it means that the vehicle speed may be higher than the set vehicle speed for ACC control, such as when the ideal speed for coordinated traffic flow control exceeds the set vehicle speed that is the speed desired by the driver. If cruise control is performed at a speed higher than the set vehicle speed, it may feel odd to the driver. Therefore, if the set vehicle speed is input and the vehicle 1 is to be run at a vehicle speed that is higher than the set vehicle speed due to acceleration control, the ECU 20 preferably performs control to obtain permission from the driver beforehand to run the vehicle at a vehicle speed higher than the set vehicle speed. For example, the ECU 20 may inform the driver via a display on a display device, for example, or voice guidance or the like that the optimum speed for coordinated traffic flow control is a speed that is higher than the set speed, and obtain permission to run the vehicle 1 at the optimum speed. The means for the driver to give or not give permission may be the operation of a switch or the like. Obtaining permission from the driver in this way makes it possible to run the vehicle 1 at a speed that can optimize traffic flow under the command of the driver.

In this way, with the vehicle control system 1-1, it is possible to select the optimum host vehicle required acceleration $a_{req}$ according to minimum select between the ACC required acceleration $a_{acc}$ and the coordinated required acceleration $a_{coordinate}$. As the required acceleration that is an object for adjustment, if there is another required acceleration in addition to the ACC required acceleration $a_{acc}$ and the coordinated required acceleration $a_{coordinate}$, the host vehicle required acceleration $a_{req}$ may also be determined according to minimum select of these required accelerations. An example of this is when a required acceleration that requires an automatic braking operation in a Pre-Crash Safety (PCS) system (hereinafter simply referred to as "PCS required acceleration $a_{pcs}$") is required for the vehicle 1. The PCS required acceleration is required based on the relative relationship between the host vehicle 1 and a leading vehicle traveling right in front of the host vehicle 1 or an obstacle ahead of the host vehicle 1. That is, the PCS required acceleration $a_{pcs}$ corresponds to a second required acceleration. Here, the relative relationship with the leading vehicle is the vehicle-to-vehicle distance or the vehicle-to-vehicle time, and the relative relationship with an obstacle is the distance to the obstacle or the time to reach the obstacle, or the like. If the PCS required acceleration is required, the smallest value among the ACC required acceleration $a_{acc}$, the coordinated required acceleration $a_{coordinate}$, and the PCS required acceleration is used as the host vehicle required acceleration $a_{req}$.

When ACC control is not being executed or if an ACC control system is not provided in the vehicle 1, and the host vehicle required acceleration $a_{req}$ is selected from the coordinated required acceleration $a_{coordinate}$ and the PCS required acceleration $a_{pcs}$, the smallest value of the coordinated required acceleration $a_{coordinate}$ and the PCS required acceleration $a_{pcs}$ may be used.

In this way, selecting the smallest value, from among the ACC required acceleration $a_{acc}$ or PCS required acceleration $a_{pcs}$ required based on the relative relationship between the host vehicle and a leading vehicle or an obstacle by an autonomous system (i.e., ACC control or PCS system), and the coordinated required acceleration $a_{coordinate}$ required based on information related to the running states of the vehicles on the road by coordinated traffic flow control, makes it possible to appropriately determine the host vehicle required acceleration $a_{req}$, and set the control target in the control of the vehicle 1 appropriately.

An autonomous system is a system that autonomously determines the required acceleration, for example. This autonomous determination refers to determining the required acceleration not based on information related to the running states of the vehicles on the road, such as vehicles excluding the host vehicle and the vehicle right in front of the host vehicle, for example. For example, the ACC required acceleration $a_{acc}$ is determined based on the relative relationship (such as the vehicle-to-vehicle distance or the vehicle-to-vehicle time) between the host vehicle and the leading vehicle with following control, and is determined based on the set vehicle speed set by the driver with constant running control. Therefore, the ACC required acceleration $a_{acc}$ is a required acceleration that is determined autonomously, not a required acceleration that is determined based on information related to the running state of another vehicle excluding the leading vehicle right in front of the host vehicle. Similarly, the PCS required acceleration is a required acceleration that is determined autonomously, not a required acceleration that is determined based on information related to the running state of another vehicle excluding the leading vehicle right in front of the host vehicle.

Meanwhile, with coordinated traffic flow control, the required acceleration is determined based on the ideal speed, the ideal acceleration, and the ideal vehicle-to-vehicle interval or the like that is based on the surrounding traffic flow situation. The ideal speed is, for example, a target speed that is common to other vehicles, or an optimum speed based on the vehicle speeds of system-equipped vehicles ahead that are undetectable by the vehicle-to-vehicle distance sensor 30. That is, coordinated traffic flow control is coordinated control in which the required acceleration of each vehicle is determined based on a control target common to other vehicles, or in which a required acceleration is determined based on information related to the running states of other vehicles undetected with an autonomous sensor. In this example embodiment, this coordinated control is executed based on information relate to the running states of vehicles on the road that is obtained via communication.

The autonomous system is not limited to an ACC control and PCS system. That is, the required acceleration according to another system that determines a required acceleration based on the relative relationship between the host vehicle and a leading vehicle or an obstacle may also be included as the required acceleration that is an object of the adjustment that selects the smallest value.

Also, a required acceleration of an autonomous system other than a system that determines the required acceleration based on the relative relationship between the host vehicle and a leading vehicle or an obstacle may also be included as a required acceleration that is the object of adjustment. For example, a required acceleration based on the running environment, such as the road gradient, a bend, a toll road or the like ahead of the host vehicle 1 may also be included as an object for adjustment. Further, all of the required accelerations including the required acceleration of an autonomous system and the required acceleration of a coordinated control system may be set as objects for adjustment, and the smallest value of these may be used as the host vehicle required acceleration $a_{req}$. Fuel efficiency and riding comfort can be improved and the like by controlling the manner in which the speed is changed by adjusting the required acceleration. Also, selecting the smallest value from among a plurality of required accelerations makes it possible to perform assist that gives priority to greater deceleration, and thus ensure vehicle-to-vehicle distance and the like.

The driver required acceleration that is the required acceleration based on a driving operation such as an accelerator operation or a brake operation by the driver is given priority over all other required accelerations. That is, when there is an operation by the driver that inputs a driver required acceleration, vehicle control based on this driver required acceleration in stead of the other required accelerations is performed.

The ECU 20 may adjust not only the plurality of the required acceleration but also a plurality of required speeds. For example, the smallest value from among a plurality of required speeds may be selected as the target speed.

In this example embodiment, the optimum speed as the "ideal speed" is determined in each system-equipped vehicle, but the invention is not limited to this. For example, the optimum speed may also be determined by the infrastructure system 1-2. In this case, the infrastructure system 1-2 may determine the optimum speed based on the amount of traffic measured by the traffic amount measuring apparatus 41 or information obtained from each system-equipped vehicle through roadside-to-vehicle communication, for example. The infrastructure system 1-2 may also transmit the speed at which it is possible to inhibit the critical state from being reached as the common optimum speed to each system-equipped vehicle through roadside-to-vehicle communication. Also, when the infrastructure system 1-2 has recognized congestion based on information obtained from system-equipped vehicles, the infrastructure system 1-2 may transmit an optimum speed based on the speed at the location of the congestion to the system-equipped vehicles behind the congestion, i.e., the system-equipped vehicles that are approaching the congestion. Further, when the infrastructure system 1-2 has recognized that congestion has been relieved, the infrastructure system 1-2 may transmit an optimum speed based on the speeds of system-equipped vehicles that are distanced from the congestion to system-equipped vehicles that are in the group of vehicles in the congestion.

Also, in this example embodiment, the vehicle control system 1-1 obtains information related to the amount of traffic from the infrastructure system 1-2 on the roadside, but the way in which the information related to the amount of traffic is obtained is not limited to this. For example, the system-equipped vehicles may recognize the surrounding traffic flow situation based on the amount of nearby traffic that is detected by the host vehicle 1 or the amount of traffic nearby that is detected by another system-equipped vehicle. The amount of traffic nearby the system-equipped vehicles may be detected by, for example, detecting the relative position with respect to each vehicle and the number of vehicles traveling nearby using a radar sensor or the like, or detecting the relative position with respect to each vehicle and the number of vehicles traveling nearby based on image data of the area around the host vehicle 1 captured by a camera or the like. If the traffic flow situation in a range within which vehicle-to-vehicle communication is possible is recognized by the system-equipped vehicles sharing, via vehicle-to-vehicle communication, information regarding the amount of nearby traffic that is obtained in this way, coordinated traffic flow control can be executed without the infrastructure system 1-2, or coordinated traffic flow control can be executed in an area outside of the communication range with the infrastructure system 1-2.

Also, a system-equipped vehicle may not only communicate back and forth with another system-equipped vehicle, but also relay communication between other system-equipped vehicles, or relay roadside-to-vehicle communication between the infrastructure system 1-2 and another system-equipped vehicle. Accordingly, communication among system-equipped vehicles that are separated by a distance, or roadside-to-vehicle communication between the infrastructure system 1-2 and a system-equipped vehicle traveling in a position far from the infrastructure system 1-2 can be performed smoothly. Also, coordinated traffic flow control is able to be executed over a wide range, even on roads where the communicable range for roadside-to-vehicle communication or vehicle-to-vehicle communication tends to be narrow, such as roads in mountainous areas. Similarly, the infrastructure system 1-2 may not only communicate back and forth with system-equipped vehicles, but also relay vehicle-to-vehicle communication among system-equipped vehicles. Moreover, an relay station or an relay vehicle that relays roadside-to-vehicle communication and vehicle-to-vehicle communication may also be provided.

Further, the infrastructure system 1-2 may transmit, via roadside-to-vehicle communication, not only information related to the amount of traffic, but also other information related to road traffic. Information related to road traffic includes, for example, traffic information related to regulations such as traffic regulations and speed limits, and information related to road conditions and the like.

As described above, the vehicle control system of the invention is applied to making a control value in vehicle control appropriate.

The invention claimed is:

1. A vehicle control system comprising:
a controller that is provided in a host vehicle and that controls an acceleration of the host vehicle based on a minimum value, from among a first required acceleration and a second required acceleration, that is used as a target acceleration of the host vehicle, wherein:
the first required acceleration is based on information related to a running state of a vehicle on a road ahead of the host vehicle that is obtained via at least one of vehicle-to-vehicle communication with the vehicle and roadside-to-vehicle communication,
the second required acceleration is based on a relative relationship between the host vehicle and at least one of a leading vehicle traveling right in front of the host vehicle and an obstacle ahead of the host vehicle and is determined autonomously by an autonomous system, and
the first required acceleration is calculated based on an acceleration of the vehicle traveling ahead of the host vehicle, a speed of the vehicle traveling ahead of the host vehicle, a current speed of the host vehicle, a vehicle-to-vehicle interval calculated based on information related to the running state of the vehicle ahead of the host vehicle, and a current vehicle-to-vehicle interval.

2. The vehicle control system according to claim 1, wherein the controller obtains a target speed based on the information related to the running state, and sets the first required acceleration based on the target speed.

3. The vehicle control system according to claim 2, wherein
the information related to the running state includes a front vehicle speed that is the speed of the vehicle traveling ahead of the host vehicle; and
the target speed is determined based on the front vehicle speed.

4. The vehicle control system according to claim 2, wherein the target speed is determined so as to inhibit congestion on the road from occurring.

5. The vehicle control system according to claim 4, wherein
the information related to the running state includes an amount of traffic on the road; and
the target speed is determined based on a relationship between a running speed and an amount of traffic able to travel on the road.

6. The vehicle control system according to claim 2, wherein when a set vehicle speed that is a vehicle speed desired by a driver has been input, and the target speed is higher than the set vehicle speed, and the controller controls the host vehicle to run at a vehicle speed that exceeds the set vehicle speed by controlling the acceleration, the controller performs control to obtain permission from a driver beforehand to run the host vehicle at the vehicle speed that exceeds the set vehicle speed.

7. The vehicle control system according to claim 1, wherein the controller obtains a target value related to the relative relationship between the host vehicle and the leading vehicle based on the information related to the running state of the vehicle ahead of the host vehicle, and sets the first required acceleration based on the target value.

8. The vehicle control system according to claim 1, wherein
the controller obtains an optimum acceleration based on the information related to the running state of the vehicle ahead of the host vehicle, and
sets the first required acceleration based on the optimum acceleration.

9. The vehicle control system according to claim 8, wherein
the information related to the running state includes a front vehicle acceleration target value that is a target value of an acceleration of the vehicle traveling ahead of the host vehicle; and
the optimum acceleration is the front vehicle acceleration target value.

* * * * *